United States Patent [19]

Shinoda et al.

[11] Patent Number: 4,696,805
[45] Date of Patent: Sep. 29, 1987

[54] METHOD FOR DESULFURIZING EXHAUST GAS

[75] Inventors: Naoharu Shinoda; Atsushi Tatani; Masakazu Onizuka; Susumu Okino, all of Hiroshima; Taku Shimizu, Tokyo, all of Japan

[73] Assignee: Mitsubishi Jukogyo Kabushiki Kaisha, Japan

[21] Appl. No.: 821,600

[22] Filed: Jan. 23, 1986

[30] Foreign Application Priority Data

Feb. 5, 1985 [JP] Japan .................................. 60-19269
Feb. 5, 1985 [JP] Japan .................................. 60-19273

[51] Int. Cl.$^4$ .............................................. C01B 17/00
[52] U.S. Cl. ..................................... 423/242; 423/240
[58] Field of Search ... 423/244 A, 244 R (U.S. only), 423/242 R, 242 A, 240 R

[56] References Cited

U.S. PATENT DOCUMENTS

| 3,904,742 | 9/1975 | Akimoto | 423/242 |
| 3,985,860 | 10/1976 | Mandelek et al. | 423/242 |
| 4,328,195 | 5/1982 | Mori et al. | 423/242 |
| 4,539,190 | 9/1985 | Shinoda et al. | 423/240 |

FOREIGN PATENT DOCUMENTS 2532373 1/1977 Fed. Rep. of Germany .
2541821 3/1977 Fed. Rep. of Germany .

Primary Examiner—Gregory A. Heller
Attorney, Agent, or Firm—Toren, McGeady & Associates

[57] ABSTRACT

Here are disclosed a method for desulfurizing an exhaust gas which is characterized by comprising a gas absorbing section in which an absorbing solution absorbs $SO_2$ in the exhaust gas in order to become an acid solution containing a sulfite; an oxidizing section in which the sulfite is oxidized; a neutralizing section in which the absorbing solution is neutralized by adding an $SO_2$ absorbent; and a closed circulating circuit for delivering the solution drawn out from the gas absorbing section to the oxidizing section, delivering the solution drawn out from the oxidizing section to the neutralizing section, and delivering the solution drawn out from the neutralizing section to the gas absorbing section; and a method for simultaneously treating $SO_2$ and HCl which the abovementioned exhaust gas contains.

6 Claims, 5 Drawing Figures

METHOD FOR DESULFURIZING EXHAUST GAS

BACKGROUND OF THE INVENTION (1) Field of the Invention

The present invention relates to a method for desulfurizing an exhaust gas in a wet lime/gypsum process exhaust gas desulfurizing apparatus, and to a method for treating an exhaust gas containing $SO_2$ and HCl together.

(2) Description of the Prior Art

A wet lime/gypsum process exhaust gas desulfurizing apparatus for removing $SO_2$ in an exhaust gas therefrom by the use of $CaCO_3$ as an absorbent is most prevalent for the exhaust gas desulfurization of late, and this type of apparatus is described in detail in many publications. For the purpose of directly recovering gypsum as a by-product from an $SO_2$ gas absorption tower, a method for blowing air into an absorbing solution is disclosed in Japanese Patent Publication No. 17,318/1975. Here, reference will be made to the conventional method in accordance with FIG. 2.

In FIG. 2, an exhaust gas inlet 2 is provided at an upper portion of a tower body 1, and an exhaust gas outlet 3 is provided at an lower portion thereof. In the tower 1 and under the exhaust gas outlet 3, there is an absorbing solution storage section 5, in which a stirrer 4 and an air introduction pipe 8 are disposed. A spray nozzle 7 for spraying a slurry containing Ca compounds is disposed at an upper portion of the tower 1, and is connected to the absorbing solution storage section 5 via a pipe provided with a circulating pump 6 in the middle thereof.

The exhaust gas containing $SO_2$ is introduced into the tower 1 through the exhaust gas inlet 2, flows downward in the tower 1, and is discharged through the exhaust gas outlet 3. On the other hand, the slurry jetted through the spray nozzle 7 flows downward through a grid filler 9, while brought into contact with the exhaust gas. Then, in the absorbing storage section 5, the slurry is brought into contact with air fed through the air introduction pipe 8, while stirred by the stirrer 4, and it is delivered to the spray nozzle 7 by means of the circulating pump 6 again.

On the other hand, $CaCO_3$ which is a kind of absorbent is fed through an absorbent feed pipe 11 in compliance with an amount of absorbed $SO_2$, and thus the absorbing solution which has become acidic by the absorption of $SO_2$ is thereby neutralized to calcium sulfite, which is further oxidized to calcium sulfate (gypsum). The thus formed calcium sulfate must be discharged from the system on the basis of material balance. Therefore, a part of the absorbing solution is drawn out from the absorbing solution storage section 5 through an absorbing solution draw pipe 12.

The slurry which has been sprayed through the spray nozzle 7 and which will be brought into contact with the exhaust gas contains calcium sulfate as the main component, and unreacted $CaCO_3$ and some unoxidized calcium sulfite. By absorbing $SO_2$, an acidic sulfite is produced in the slurry and the latter falls onto the surface 10 of the solution in the absorbing solution storage section 5.

The part of the absorbing solution drawn out through the absorbing solution draw pipe 12 is delivered to a filter device in order to recover the secondarily produced gypsum, but for the purpose of heightening the purity of the by-product gypsum, it is necessary to lower the concentrations of unreacted $CaCO_3$ and unoxidized calcium sulfite.

However, in the conventional process, the one tank type absorbing solution storage section 5 is used, and while $CaCO_3$ which is the alkaline absorbent is fed through the absorbing solution feed pipe 11, the air oxidation is simultaneously carried out. Therefore, such a process has the drawback that the unreacted $CaCO_3$ and the unoxidized calcium sulfite will remain therein inevitably.

Thus, if it is attempted to decrease a feed of the absorbent $CaCO_3$ and to thereby diminish an amount of the remaining $CaCO_3$, a pH of the absorbing solution will lower and an $SO_2$ absorbing performance will deteriorate inconveniently. Further, in order to reduce this inconvenience as much as possible, it has been tried to increase the volume of the absorbing solution storage section, but such a strategy cannot provide any sufficient effect in spite of a great economical loss.

SUMMARY OF THE INVENTION

With regard to oxidation reactions and dissolution reactions of calcium sulfite, intensive researches have been made, and on the basis of the grasp of their characteristics, the present invention has been completed by which the above-mentioned drawbacks of the conventional techniques can be solved.

Moreover, the present invention provides another method by which the above-mentioned disadvantages of the conventional ones can be overcome and by which there can be prevented a phenomenon of impeding the dissolution of $CaCO_3$ due to $CaCl_2$ formed by the absorption of HCl.

That is to say, earnest investigations have been performed about the oxidation reaction of calcium sulfite and the dissolution reaction of $CaCO_3$, and as a result, it has been found that the dissolution reaction of $CaCO_3$ is slow in the absorbing solution containing the sulfite; that if $CaCO_3$ is added to the absorbing solution after the perfect oxidation for the formation of the sulfite, the dissolution of $CaCO_3$ will be accelerated remarkably; and that if $CaCl_2$ which has been formed by absorbing HCl is converted into a chloride other than calcium chloride, the dissolution of $CaCO_3$ will be more accelerated, whereby the residual $CaCO_3$ in the absorbing solution can be decreased outstandingly. In consequence, the present invention has now been achieved.

DESCRIPTION OF THE PREFERRED EMBODIMENTS

Figure 1:
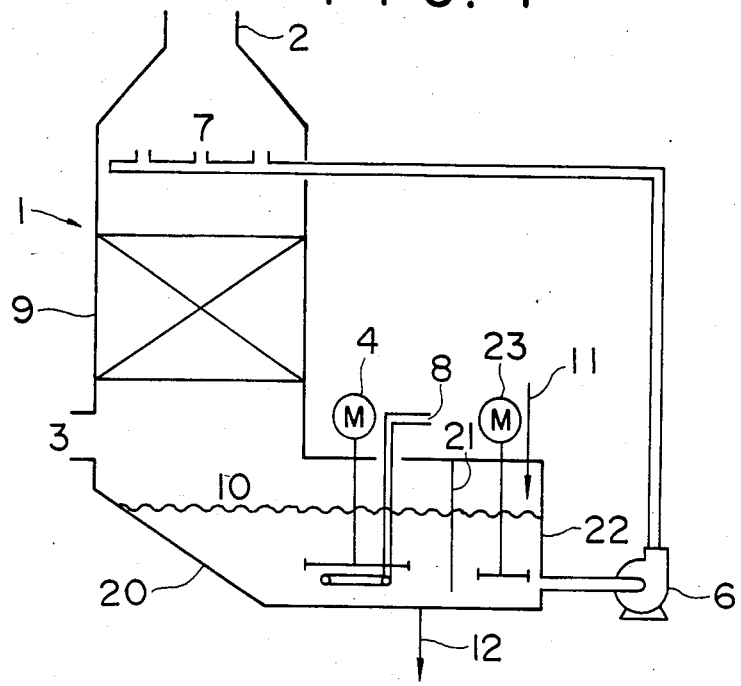
FIG. 1 shows an exhaust gas desulfurizing apparatus suitable for a practice of the present invention.

The present invention provides a method for desulfurizing an exhaust gas which is characterized by comprising a gas absorbing section in which an absorbing solution absorbs $SO_2$ in the exhaust gas in order to become an acid solution containing a sulfite; an oxidizing section in which the sulfite is oxidized; a neutralizing section in which the absorbing solution is neutralized by adding an SO₂ absorbent; and a closed circulating circuit for delivering the solution drawn out from the gas absorbing section to the oxidizing section, delivering the solution drawn out from the oxidizing section to the neutralizing section, and delivering the solution drawn out from the neutralizing section to the gas absorbing section.

Further, the present invention provides a method for treating SO₂ and HCl simultaneously which is characterized by comprising a gas absorbing section in which an absorbing solution absorbs SO₂ and HCl to become an acid solution containing a sulfite and a chloride; an oxidizing section in which the sulfite is oxidized by blowing air into the absorbing solution; a neutralizing section in which the absorbing solution is neutralized by feeding at least one of CaCO₃ and Ca(OH)₂ thereto which is a neutralizing agent; and a closed circulating circuit for delivering the solution drawn out from the gas absorbing section to the oxidizing section, delivering the solution drawn out from the oxidizing section to the neutralizing section, and delivering the solution drawn out from the neutralizing section to the gas absorbing section; gypsum being recovered as a by-product from the absorbing solution in the closed circulating circuit; a chloride being taken out in the form of an aqueous solution.

In the present invention, it is preferred to employ a means of blowing air into the absorbing solution in the oxidizing section, or into both the absorbing solutions in the oxidizing and neutralizing sections for the sake of the oxidation of the sulfite. In the present invention, as the absorbents for SO₂, there are preferably together used at least one of CaCO₃ and Ca(OH)₂ which is a base component, and at least one of a magnesium compound, a sodium compound or a manganese compound which is an additive to improve a reaction percentage of the base component and accelerate the oxidation of the sulfites.

In the present invention, it is preferable to adjust the concentration of CaCO₃ in the absorbing solution in the neutralizing section to less than 2% by weight, and it is also preferable to draw out a part of the absorbing solution from the oxidizing section for the purpose of recovering gypsum which is the by-product.

Now, the present invention will be described in detail in reference to an embodiment shown in FIG. 1.

At the upper portion of a tower 1, an exhaust gas inlet 2 is provided, and at the lower portion thereof, an exhaust gas outlet 3 is provided. Under the exhaust gas outlet 3 and in the tower 1, there is an oxidizing section 20 for oxidizing a sulfite in an absorbing solution, in which a stirrer 4 and an air introduction pipe 8 are disposed.

A neutralizing section 22 which is a liquid chamber separated from the oxidizing section 20 by a partition 21 is disposed in the tower 1, and in the section 22, a stirrer 23 is provided.

In the present invention, an absorbent feed pipe 11 through which CaCO₃ is added to the neutralizing section 22 is disposed therein, and an absorbing solution draw pipe 12 through which the absorbing solution mainly containing gypsum is drawn out is disposed in the oxidizing section 20. According to the above-mentioned constitution, the following characteristic effects of the present invention could be obtained:

(a) Since the CaCO₃ absorbent is not fed to the oxidizing section 20, the acidic sulfite can perfectly be oxidized to a sulfate.

On the contrary, when the oxidization is carried out while the absorbent is being added as in the conventional process, the neutralization rate with alkali CaCO₃ will be faster than the dissolution rate of oxygen, so that neutral calcium sulfite which will be difficult to oxidize will be formed.

Therefore, the conventional process has the drawback that unoxidized calcium sulfite remains.

It is well known that neutral calcium sulfite is hardly oxidized with oxygen. Usually, calcium sulfite would be oxidized with oxygen after its conversion into acidic calcium sulfite (which is also called calcium bisulfite) by adding an acid thereto, which fact indicates that in the conventional technique, the oxidation will be apt to be incomplete.

(b) In the neutralizing section 22, no sulfite is present, i.e., the sulfate into which all the sulfite has been converted is present. Thus, the reaction percentage of CaCO₃ can be improved, and an amount of the remaining unreacted CaCO₃ in the absorbing solution can be diminished remarkably.

CaCO₃ is a compound having a small solubility, but it will dissolve in an acid solution in accordance with the following formula (1):

$$CaCO_3 + H^+ \rightarrow Ca^{2+} + HCO_3^- \quad (1)$$ 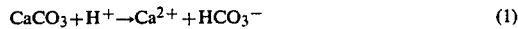

However, the rate of this dissolution reaction highly varies with whether an anion of the acid compound is a sulfuric ion or a sulfurous ion.

$$CaCO_3 + H^+ + HSO_3^- \rightarrow Ca^{2+} + HSO_3^- + HCO_3^- \quad (2)$$ 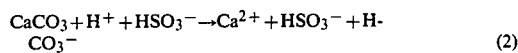

$$Ca^{2+} + HSO_3^- + HCO_3^- \rightarrow CaSO_3 + H_2CO_3 \quad (3)$$ 

$$CaCO_3 + H^+ + HSO_4^- \rightarrow Ca^{2+} + HSO_4^- + HCO_3^- \quad (4)$$ 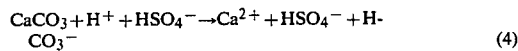

$$Ca^{2+} + HSO_4^- + HCO_3^- \rightarrow CaSO_4 + H_2CO_3 \quad (5)$$ 

That is to say, the reactions of sulfurous acid are represented by formulae (2) and (3), and those of sulfuric acid are represented by formulae (4) and (5). It can be considered that a difference of whether the product is CaSO₃ of the formula (3) or CaSO₄ of the formula (5) has a great influence on the dissolution reaction of CaCO₃.

Figure 3:
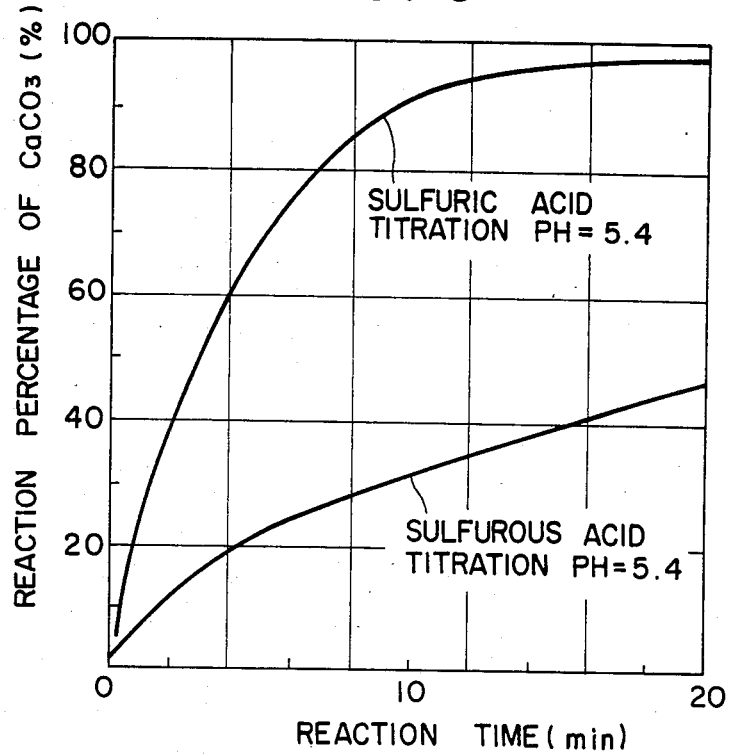
FIG. 3 shows fundamental experimental data to support effects of the present invention.

FIG. 3 shows experimental data of dissolution rates of CaCO₃ in a sulfurous acid solution and a sulfuric acid solution. The data therein were obtained as follows: A CaCO₃ powder (average grain diameter 15 μm) and water were placed in a beaker (initial concentration of CaCO₃ 15 g/l, solution temperature 50° C.), and each acid was added dropwise thereto so that a pH of the reaction solution might be maintained at 5.4 under an automatic adjustment. In this way, the reaction percentage of CaCO₃ was determined repeatedly under identical conditions. By the thus determined average values, the experimental data in FIG. 3 are constituted, and their results indicate that the dissolution rate of CaCO₃ in the presence of sulfurous acid is low.

The experiment by which the results in FIG. 3 were obtained will be described in detail.

In a glass beaker are placed 2 liters of distilled water, and 30 g of CaCO₃ are then added thereto in order to form a CaCO₃ slurry. An SO₂ gas and an O₂ gas are blown thereinto to react all of $CaCO_3$ therewith, thereby preparing a gypsum slurry, which will be hereinafter referred to as the $SO_2$ absorbing solution. Gypsum is separated from this solution by the use of a filter, and the consequently obtained filtrate will be used as a regulating solution.

This regulating solution is then placed in a reactor, and limestone ($CaCO_3$) which has been ground to 325 mesh and under (44 μm or less) is added thereto so that its concentration may be 15 g/l. Stirring is carried out by the use of a stirrer to form a $CaCO_3$ slurry (average grain diameter of the $CaCO_3$ powder 15 μm). Since the limestone powder is alkaline, a pH of this $CaCO_3$ slurry becomes 7 or more.

Next, the acid is added dropwise to the beaker from a burette, and at this time, a pH of the $CaCO_3$ slurry becomes 4 or less. However, when the addition of the acid is interrupted, the pH changes toward an alkaline side since $CaCO_3$ begins to be gradually dissolved out therefrom. A settled value of the pH of the slurry in the beaker is decided in proportion of an addition rate of the acid from the burette (i.e., the feed rate of the acid) to the elution rate of $CaCO_3$.

In short, the dropping addition rate of the acid from the burette can be adjusted so that the pH of the $CaCO_3$ slurry may be 5.4 (since the elution of $CaCO_3$ takes a long time, such an operation is possible, but in the instantaneous reaction such as a neutralization reaction between $NaOH$ and $H_2SO_4$, it is impossible).

In the experiment, a pH control was carried out by detecting the pH of the slurry by means of a pH meter and automatically operating an acid dropping addition rate regulator via a pH controller.

When the acid is added dropwise thereto, $CaCO_3$ can be dissolved and a product corresponding to a kind of acid can be obtained. For example, if the acid is sulfuric acid, calcium sulfate (gypsum) will be formed, and if it is sulfurous acid, calcium sulfite will be obtained. Since it is possible to know a concentration of residual $CaCO_3$ with time by an analysis, a $CaCO_3$ reaction percentage can be determined from a proportion an amount of remaining $CaCO_3$ to its initial amount (the reaction solution referred to above means the slurry in the beaker after the acid has begun to be added to $CaCO_3$).

In the present invention, the neutralization of the acid is carried out with the fed $CaCO_3$ material in the neutralizing section 22, and thus the dissolving rate of $CaCO_3$ can be improved and the amount of unreacted $CaCO_3$ in the absorbing solution can be lowered to almost zero.

EXAMPLE 1

In a pilot plant having a scale of 8,000 $m^3N$/h for treating an exhaust gas from a coal-fired boiler, an effect of the present invention was established.

The pilot plant had such an $SO_2$ gas absorbing apparatus as shown in FIG. 1, and the exhaust gas at an exhaust gas inlet 2 had the following properties.

| | |
|---|---|
| Flow Rate of Exhaust Gas | 8,000 $m^3N$/h |
| Temperature of Exhaust Gas | 150° C. |
| Concentration of $SO_2$ | 2,000 ppm (Dry) |
| Concentration of Fly Ash | 300 mg/$m^3N$ |
| Concentration of HCl | 70 ppm |
| Concentration of HF | 30 ppm |

The exhaust gas at the exhaust gas outlet 3 under steady operation conditions had the following properties:

| | |
|---|---|
| Temperature of Exhaust Gas | 55° C. |
| Concentration of $SO_2$ | 100 ppm |
| Concentration of Fly Ash | 30 mg/$m^3N$ |
| Concentration of HCl | 1 ppm or less |
| Concentration of HF | 1 ppm or less |

In an oxidizing section 20, a volume of the absorbing solution was 4 $m^3$, and its pH was 5.0. A $CaCO_3$ slurry having a concentration of 20% by weight was fed to a neutralizing section 22 through an absorbent feed pipe 11 so that a volume and a pH of the absorbing solution in the neutralizing section 22 might be 4 $m^3$ and 6.0, respectively.

Air was introduced into the oxidizing section 20 through an air introduction pipe 8 at a flow rate of 400 $m^3N$/h. Although not shown in FIG. 1, an air introduction pipe was provided under a stirrer 23 in the neutralizing section 22 in order to introduce air at a flow rate of 200 $m^3N$/h, and at this time, a $CaCO_3$ reaction percentage in the absorbing solution was further improved. However, also when air was not fed additionally, a sufficiently high reaction percentage as high as 95% or more could be obtained. The typical absorbing solution drawn out from the absorbing solution draw pipe 12 had the following properties:

| | |
|---|---|
| Concentration of $CaSO_4.2H_2O$ in Absorbing Solution | 20 wt % |
| Concentration of $CaCO_3$ in Absorbing Solution | 0.2 wt % or less |
| Concentration of Sulfite in Absorbing Solution | Not Detected at 0.001 mol/l or less |
| Online pH of Absorbing Solution | 5.0 |

Figure 2:
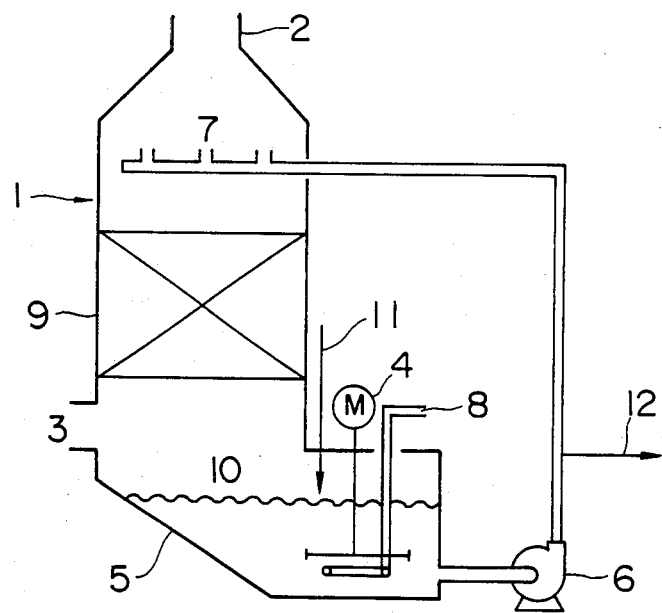
FIG. 2 shows a conventional exhaust gas desulfurizing apparatus.

For comparison, when carried out in accordance with the conventional method shown in FIG. 2, a concentration of the remaining sulfite was 0.01 mol/l. Even when a largely excessive amount of the $CaCO_3$ absorbent was fed to the absorbing solution, its pH of was at most 5.0, and a concentration of the remaining $CaCO_3$ in the absorbing solution was as high as 2% by weight or more. On the contrary, in the present invention, it was established that the sulfite in the absorbing solution was not detected and the concentration of the remaining $CaCO_3$ could be maintained at a level of less than 2% by weight. The absorbing solution drawn out was then delivered to a centrifugal separator (not shown in FIG. 1) in order to recover the gypsum by-product, which was high in purity and was industrially valuable as gypsum board.

In the present invention, when as an absorbent for $SO_2$, there were together used a base component comprising at least one of $CaCO_3$ and $Ca(OH)_2$ and at least one of a magnesium compound and a sodium compound, the oxidization tended to make progress in a more perfect state and the percentage of the reaction with $CaCO_3$ and/or $Ca(OH)_2$ which was the base component for $SO_2$ absorption was also improved. Further, when $Mn^{2+}$ was used as an oxidation accelerator, the oxidation of the sulfite was more accelerated, which fact permitted diminishing an amount of blown air and reducing volumes of the oxidizing section and the nuetralizing section.

Furthermore, the present invention is directed to a method for simultaneously treating SO₂ and HCl contained in an exhaust gas to purify the latter, the method being characterized by comprising a gas absorbing section in which an absorbing solution containing a calcium compound absorbs SO₂ and HCl to become an acid solution containing a sulfite and a chloride; an oxidizing section in which the sulfite is oxidized by blowing air into the absorbing solution; a neutralizing section in which the absorbing solution is neutralized by feeding at least one of CaCO₃ and Ca(OH)₂ as a neutralizing agent thereto; and a closed circulating circuit for delivering the solution drawn out from the gas absorbing section to the oxidizing section, delivering the solution drawn out from the oxidizing section to the neutralizing section, and delivering the solution drawn out from the neutralizing section to the gas absorbing section; at least one cation selected from the group consisting of Na⁺, K⁺, Mg²⁺ and NH₄⁺ being contained in the absorbing solution in an amount of one equivalent or more of a Cl concentration in the absorbing solution; gypsum being recovered as a by-product from the absorbing solution in the closed circulating circuit; the chloride being taken out in the form of an aqueous solution of a chloride other than the calcium compound.

Now, the above-mentioned invention will be described in detail in accordance with an embodiment shown in FIG. 4.

An amount of unreacted CaCO₃ remaining in the absorbing solution can be decreased due to the above functional effects (a) and (b) which have been discussed in the description regarding FIG. 1, and thus the absorbing solution in the oxidizing section 20 contains gypsum grains mainly.

From an absorbing solution delivered to a gypsum separator 14 by means of a pump 13, a by-product gypsum 15 is separated, and the remaining solution is then returned to an oxidizing section 20 via a line 16. On the other hand, most of the oxidized absorbing solution is delivered to a neutralizing section 22 and is neutralized with CaCO₃ fed through an absorbent feed pipe 11, and is then circulated to the absorbing section provided with a spray nozzle 7 and a grid filler 9, by a circulating pump 6.

In the absorbing section, SO₂ and HCl are absorbed by the absorbing solution, and SO₂ is recovered as the by-product gypsum 15 as described above but HCl is dissolved in the absorbing solution in the state of CaCl₂ having a high solubility, when neutralized with CaCO₃. This dissolving chloride is removed in the following manner: A clarified solution collector 17 is used which comprises a tube having an opened bottom end and a closed top end, the closed end of this tube being connected to a pipe for guiding the clarified solution therethrough. The thus constituted collector 17 is dipped in the absorbing solution in which the gypsum grains are mainly suspended, and the aqueous CaCl₂ solution is then sucked up through the collector 17 by means of a pump 18. This solution is delivered to a commercially available drier 19, and is evaporated to dryness thereby in order to recover a solid chloride 24. A heat source for the drier 19 can be preferably supplied by the utilization of the exhaust gas. Although not shown in any drawing, the utilization of the exhaust gas can be preferably made as follows: The aqueous solution containing the chloride is spray-dried into the exhaust gas containing SO₂ and HCl, and the resultant dried solid is then collected by a dry collector. Afterward, the exhaust gas can be utilized in the above-mentioned drier 19 for the wet treatment.

In order to further heighten the effect of the present invention, a magnesium compound, a sodium compound, an ammonium compound, or a potassium compound for decomposing CaCl₂ may be suitably selected and be added through an additive feed pipe 25.

$$CaCl_2 + Mg^{2+} \rightarrow MgCl_2 + Ca^{2+} \qquad (6)$$

$$CaCl_2 + 2Na^+ \rightarrow 2NaCl + Ca^{2+} \qquad (7)$$

$$CaCl_2 + 2NH_4^+ \rightarrow 2NH_4Cl + Ca^{2+} \qquad (8)$$

$$CaCl_2 + 2K^+ \rightarrow 2KCl + Ca^{2+} \qquad (9)$$

Ca²⁺ ions formed in the reactions (6) to (9) are combined with sulfate groups formed by the oxidization of the absorbing solution in the oxidizing section 20, so that a gypsum crystal is produced.

Figure 5:
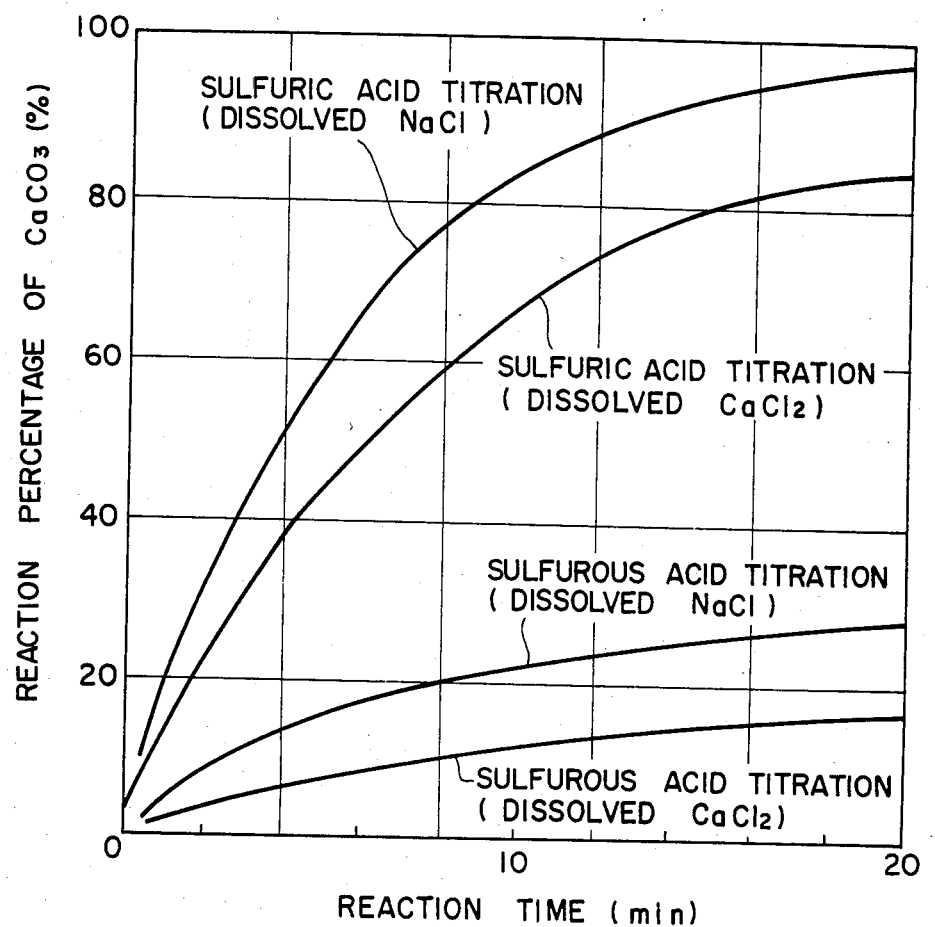
FIG. 5 is a diagram showing fundamental experimental data to support the effects of the present invention.

When the dissolved Ca²⁺ ions in the absorbing solution diminishes, CaCO₃ having a low solubility instead begins to dissolve acceleratedly, and thus the reaction percentage of CaCO₃ is more improved. FIG. 5 shows experimental data obtained by the same experiment as in the case of FIG. 3.

In this way, when at least one cation selected from the group consisting of Na⁺, K⁺, Mg²⁺ and NH₄⁺ is contained in the absorbing solution in an amount of one equivalent or more of a Cl concentration in the absorbing solution, the reaction percentage of CaCO₃ is more enhanced.

Since well soluble in water, the chloride of every cation mentioned above can be partially taken out from the absorbing solution through the clarified solution collector 17 in the form of the aqueous chloride solution by means of the pump 18. The chloride solution thus taken out can be then evaporated to dryness by the spray drier the heat source of which is the exhaust gas, thereby recovering it as a solid chloride.

Figure 4:
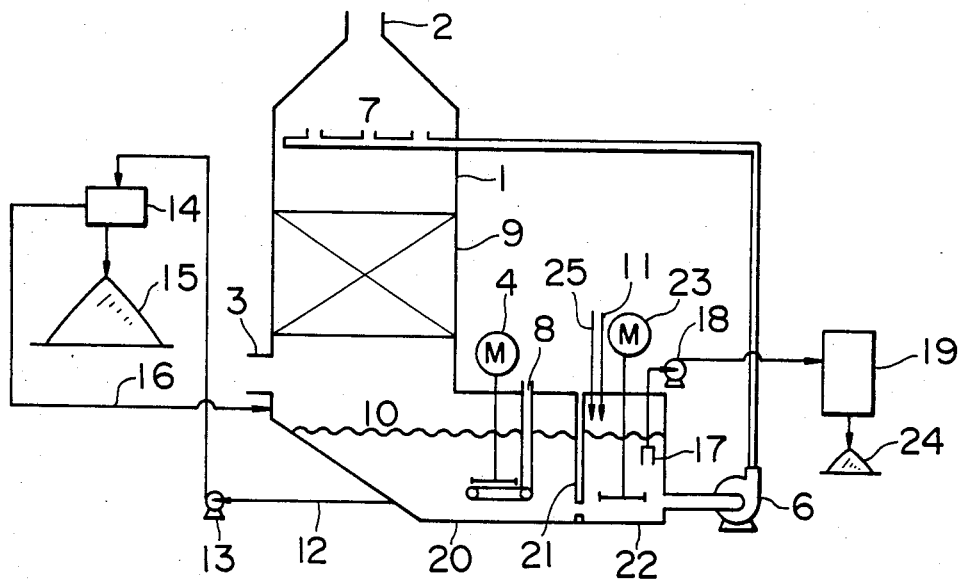
FIG. 4 is a schematic view illustrating another embodiment of the present invention.

FIG. 4 exhibits that the aqueous chloride solution is partially taken out from the neutralizing section 22 by the use of the clarified solution collector 17, and the reason why the chloride solution is preferably removed from the section 22 is that the solution to be treated in the drier 19 is not acidic and thus it permits preventing device materials from corroding and restraining an evaporated material from containing an acid gas. However, a position from which the aqueous chloride solution is taken out is not limited to the neutralizing section 22, but it may be partially collected from the oxidizing section or the absorbing section.

EXAMPLE 2

In a pilot plant having a scale of 8,000 m³N/h for treating an exhaust gas from a coal-fired boiler, an effect of the present invention was established.

The pilot plant had such an SO₂ and HCl absorbing apparatus as shown in FIG. 4, and the exhaust gas at an exhaust gas inlet 2 had the following properties.

| Flow Rate of Exhaust Gas | 8,000 m³N/h |
|---|---|
| Temperature of Exhaust Gas | 150° C. |
| Concentration of SO₂ | 1,500 ppm (Dry) |
| Concentration of HCl | 120 mg/m³N (Dry) |
| Concentration of HF | 30 ppm |
| Concentration of Dust | 250 mg/m³N |

The exhaust gas at an exhaust gas outlet 3 under steady operation conditions had the following properties on the average:

| | |
|---|---|
| Temperature of Exhaust Gas | 55° C. |
| Concentration of $SO_2$ | 30 ppm |
| Concentration of HCl | 1 ppm or less |

A volume of an absorbing solution in an oxidizing section 20 was 4 $m^3$, and its pH was about 5.0. A volume of the absorbing solution in an neutralizing section 22 was 4 $m^3$, and a $CaCO_3$ slurry having a concentration of about 20% by weight was fed to the neutralizing section 22 through an absorbent feed pipe 11 so that a pH of the absorbing solution in the neutralizing section 22 might be about 6.0.

An $Na_2CO_3$ solution was added through an additive feed pipe 25 to the neutralizing section 22, and in this case, a feed rate of the $Na_2CO_3$ solution was adjusted so that $Na^+$ might be dissolved therein in an amount of one equivalent or more based on a detected value of the Cl concentration in the absorbing solution.

Air was introduced into the oxidizing section 20 through the air introduction pipe 8 at a flow rate of 400 $m^3N/h$, while the absorbing solution was circulated at a flow rate of 120 $m^3/h$ by means of the circulating pump 6. When a steady operation was maintained, the absorbing solution was drawn out through the absorbing solution draw pipe 12 in compliance with an amount of absorbed $SO_2$ for the sake of recovering by-product gypsum. The thus drawn absorbing solution had the following properties:

| | |
|---|---|
| Concentration of $CaSO_4.2H_2O$ | 20 wt % |
| Concentration of $CaCO_3$ | 0.2 wt % |
| Concentration of Sulfite | 0.001 mol/l or less, |
| Concentration of $Cl^-$ | 0.7 mol/l |
| Concentration of $Na^+$ | 0.8 mol/l |
| Online pH of Sol. in Oxidizing Sec. | 5.3 |

For comparison, when carried out in accordance with the conventional method shown in FIG. 2, a concentration of the remaining sulfite was 0.01 mol/l.

However, heretofore, it has been judged according to a former conception that the remaining amount of 0.01 mol/l is very small. If absorbed $SO_2$ is not oxidized at all, a concentration of the remaining sulfite in the absorbing solution will be about 1 mol/l, and the remaining amount of 0.01 mol/l corresponds to 99% in terms of an oxidation percentage, and thus such a level is regarded as an almost perfect oxidization from the old thinking. However, in the course of the reseaches regarding the present invention, it has been found that such a small remaining amount of the sulfite inhibits the dissolution of $CaCO_3$, and the perfect oxidation of the sulfite up to a level of less than 0.001 mol/P has been understood to be a key point to enhance the dissolution of $CaCO_3$.

In the case that 0.01 mol/l of the sulfite remained, even when the very excessive amount of the $CaCO_3$ absorbent was fed thereto, a pH of the absorbing solution was at most 5.0, and the concentration of the remaining $CaCO_3$ in the absorbing solution was as high as 2% by weight or more. On the contrary, in the present invention, it was established that the sulfite in the absorbing solutions in the oxidizing section and the neutralizing section was not detected at less than 0.001 mol/l and the concentration of the remaining $CaCO_3$ could be maintained at a level of less than 2% by weight.

A by-product gypsum 15 prepared by delivering the absorbing solution drawn out from the oxidizing section 20 to a gypsum separator 14 and carrying out a recovery operation was high in purity and was industrially valuable as gypsum board.

Next, a clarified solution collector 17 was immersed into the absorbing solution in the neutralizing section 22 to suck up a chloride solution therefrom with the aid of a pump 18, which collector 17 was composed of a tube having an inner diameter of 250 mm, a length of 1 m, an opened bottom end and a closed top end. By adjusting an average rise rate of the solution in the collector 17 so as not to exceed a sedimentation rate of the gypsum grains, the chloride solution containing a small amount of the gypsum grains could be taken out.

The aqueous chloride solution thus taken out had the following properties:

| | |
|---|---|
| Conc. of $Cl^-$ in Collected Solution | 0.7 mol/l |
| Conc. of $Na^+$ | 0.8 mol/l |
| Conc. of Solid in Collected Solution | 2 wt % |
| pH of Collected Solution | 6.2 |

The collected solution was condensed by a drier in order to recover an NaCl solid.

EXAMPLE 3

The procedure in Example 2 was repeated with the exception that $Na_2CO_3$ fed through an additive feed pipe 25 was replaced with $Mg(OH)_2$ and a concentration of $Mg^{2+}$ was adjusted so as to be one equivalent or more based on a detected value of a Cl concentration in the absorbing solution.

As in Example 2, a concentration of remaining $CaCO_3$ in an absorbing solution could be maintained at a level of less than 2% by weight, and $SO_2$ and HCl could be recovered in the forms of by-product gypsum and $MgCl_2$, respectively.

Also when $(NH_4)_2SO_4$ was fed in place of $Mg(OH)_2$, a chloride could be taken out as $NH_4Cl$. This makes it clearly definite that the cation to be fed to the absorbing solution may be of any morphology of a hydroxide, a carbonate or a sulfate, so long as it is may be $Na^+$, $K^+$, $Mg^{2+}$ or $NH_4^+$ capable of producing the chloride.

Needless to say, when any cation was not fed, the chloride could be taken out in the form of an aqueous $CaCl_2$ solution, but the dissolution of $CaCO_3$ deteriorated and thus an amount of remaining $CaCO_3$ was apt to increase. Nevertheless, in the pilot plant for simultaneously treating $SO_2$ and HCl, the concentration of remaining $CaCO_3$ could be maintained at a level of less than 2% by weight, by which it was confirmed that the drawbacks of the conventional process could be overcome sufficiently.

EXAMPLE 4

The procedure in Example 2 was repeated with the exception that $MnSO_4$ was added as an oxidation accelerator to the absorbing solution and a concentration of Mn was adjusted so as to be within the range of 0 to 200 mg/l. When $SO_2$ was absorbed by the absorbing solution in the absorbing section packed with a grid fillter 9, the oxidation of $SO_2$ with an oxygen gas contained in an exhaust gas from a coal-fired boiler was accelerated by Mn. In consequence, a concentration of a sulfite in the absorbing solution which would fall onto the surface 10 of the absorbing solution in the oxidizing section 20 diminished, and an amount of air to be blown through an air introduction pipe 8 could be decreased in proportion to a concentration of Mn. In addition thereto, a concentration of the sulfite in the absorbing solution in the oxidizing section could be maintained at a level of less than 0.001 mol/l, and the dissolution of $CaCO_3$ was good, with the result that a concentration of remaining $CaCO_3$ could be kept at a level of less than 2% by weight.

As described above in detail, the present invention is concerned with the method comprising the gas absorbing section, the oxidizing section, the neutralizing section and the closed circuit for circulating the absorbing solution through these sections, and thus the present invention can provide the effect of rendering it possible that the unreacted and unoxidized calcium sulfite are scarcely present in the absorbing solution. That is to say, the present invention can provide the effect (oxidation accelerating effect) of preventing the incomplete oxidation phenomenon.

In addition, the exhaust gas containing $SO_2$ and HCl can be purified with a high efficiency.

What is claimed is:

1. A method for simultaneously treating $SO_2$ and HCl comprising passing said gas through a gas absorbing solution which absorbs $SO_2$ and HCl to produce an acid solution containing a sulfite and a chloride; and oxidizing section in which said sulfite is oxidized by blowing air into said absorbing solution to oxidize said sulfite; neutralizing said absorbing solution by adding a compound selected from the group consisting of $CaCO_3$ and $Ca(OH)_2$; said gas absorbing solution being passed through a closed circulating circuit for delivering said solution from said gas absorbing section to said oxidizing section, delivering said solution drawn out from said oxidizing section to said neutralizing section, and delivering said solution drawn out from said neutralizing section to said gas absorbing section; and recovering gypsum as a by-product from said absorbing solution in said closed circulating circuit; said chloride being taken out in the form of an aqueous solution.

2. A method according to claim 2 wherein at least one selected from the group consisting of $Na^+$, $K^+$, $Mg^{2+}$ and $NH_4^+$ is contained in the absorbing solution in an amount of one equivalent or more of a Cl concentration in said absorbing solution, and said chloride is taken out in the form of an aqueous solution of a different chloride than a calcium compound.

3. A method according to claim 1 or 2 wherein a manganese compound is added, as an oxidizing accelerator for said sulfite, to said absorbing solution.

4. A method according to claim 1 or 2 wherein a concentration of $CaCO_3$ in said absorbing solution in said neutralizing section is adjusted to less than 2% by weight.

5. A method according to of claim 1 or 2 wherein in order to recover gypsum as a by-product, a part of said absorbing solution is drawn out from said oxidizing step, and an aqueous chloride solution is taken out from a part of said absorbing solution in said oxidizing step or said neutralizing step.

6. A method according to claim 1 or 2 wherein the chloride is recovered in the form of a solid chloride by concentrating said aqueous chloride solution.

* * * * *